(12) United States Patent
Omar et al.

(10) Patent No.: US 8,332,085 B2
(45) Date of Patent: Dec. 11, 2012

(54) PARTICLE SWARM-BASED MICRO AIR LAUNCH VEHICLE TRAJECTORY OPTIMIZATION METHOD

(75) Inventors: Hanafy M. Omar, Dhahran (SA); Moumen M. Idres, Kula Lumper (MY); Raed Kafafy, Kula Lumper (MY)

(73) Assignee: King Fahd University of Petroleum and Minerals, Dhahran (SA)

( * ) Notice: Subject to any disclaimer, the term of this patent is extended or adjusted under 35 U.S.C. 154(b) by 218 days.

(21) Appl. No.: 12/871,649

(22) Filed: Aug. 30, 2010

(65) Prior Publication Data
US 2012/0053764 A1 Mar. 1, 2012

(51) Int. Cl.
*B64G 1/36* (2006.01)

(52) U.S. Cl. .......................... 701/13; 701/14; 701/531

(58) Field of Classification Search ............... 701/4, 13, 701/14, 531
See application file for complete search history.

(56) References Cited

U.S. PATENT DOCUMENTS

| | | | |
|---|---|---|---|
| 3,951,264 A * | 4/1976 | Heidecker et al. | 206/308.3 |
| 6,792,363 B1 | 9/2004 | Bye | |
| 6,921,051 B2 | 7/2005 | Lopata et al. | |
| 2006/0212279 A1 | 9/2006 | Goldberg et al. | |
| 2009/0070281 A1 | 3/2009 | Solomon | |

\* cited by examiner

*Primary Examiner* — David H Bollinger
(74) *Attorney, Agent, or Firm* — Richard C. Litman

(57) ABSTRACT

The particle swarm-based micro air launch vehicle trajectory optimization method is carried out by formulating a parameter optimization problem, which is solved using a particle swarm optimization procedure. The optimization problem is formulated using a single objective function having the explicit objective to maximize the payload mass. Constraints on terminal conditions are imposed.

5 Claims, 4 Drawing Sheets

PARTICLE SWARM-BASED MICRO AIR LAUNCH VEHICLE TRAJECTORY OPTIMIZATION METHOD

BACKGROUND OF THE INVENTION

1. Field of the Invention

The present invention relates to launch vehicles for air launching sub-microsatellites, and particularly to a computerized particle swarm-based micro air launch vehicle trajectory optimization method that computes an air launch trajectory that optimizes the payload mass.

2. Description of the Related Art

The demand for sub-microsatellites is growing rapidly, mainly due to the continuously increasing sophistication and decreasing size of microelectronic devices. Currently a half palm-size multi-function device, such as an iPhone® (iPhone is a registered trademark of Apple Inc. of Cupertino, Calif.), can do seamlessly as many functions as a truck full of computers and communication systems did twenty years ago. Since sub-microsatellites are normally launched as a secondary payload to a larger satellite or in a group of sub-microsatellites, they are subject to many mission constraints, such as launch time and insertion orbit. To avoid such constraints, many countries with advanced or advancing space technology are focusing on developing launch systems specifically designed and built for this category of satellites. Ambitious countries that lack the necessary infrastructure for ground launching may also benefit from this emerging space technology.

Therefore, a new method capable of launching the nanosat individually via low cost launching from an airborne platform can be a solution. By implementing air launching, there would be no restrictions on the launch sites, the launch angle and the launch direction. This can be a very strong point, especially to the countries where satellite launching is very difficult owing to geographical reasons. Moreover, "air launch" is a very economical way of launching satellites compared with the ground-launch method, because it can utilize the high initial launching speed from the mother plane, and the improved thrust efficiency resulting from low dynamic pressure and a big nozzle expansion ratio at high altitude.

Launch vehicle design is one of the very interesting applications of multidisciplinary optimization methods where the interdependence between the trajectory and vehicle design is unavoidable. The launch vehicle itself is comprised of several disciplines, which are mainly the mass characteristics, propulsion system, aerodynamic design, and flight dynamics. Each of these disciplines of design has its impact on the vehicle trajectory and launching capacity. Many researchers have studied the design optimization problem of ground-launch vehicles with trajectory optimization being the core optimization objective. A few studies have focused on the design optimization of air-launch vehicles.

A study on miniature launch vehicles has shown that downsizing of the launch vehicle inversely affects the payload fraction of the launch vehicle (payload to total mass ratio) components. It was assumed that the avionics and the attitude control system do not scale according to the cubic scaling law. As a result, a half-size Pegasus weighing about 2,384 kg would only be capable of placing a 7.9-kg payload in low earth orbit (LEO), and a half-size Pegasus XL weighing about 2,951 kg would only be capable of placing a 25.8-kg payload in LEO. In a more recent study a multidisciplinary design optimization has been performed to develop a miniature air-launch system. The study group designed an 850-kg air-launch system, which has a payload capacity of 3.25 kg. This results in payload fraction of about 0.0038, which is much lower than the Pegasus payload fraction (~0.018).

Particle swarm optimization (PSO) is a population-based stochastic optimization technique, which is inspired by social behavior of bird flocking, or fish schooling. PSO shares many similarities with evolutionary computation techniques, such as Genetic Algorithms (GA). The system is initialized with a population of random solutions and searches for optima by updating generations. However, unlike GA, PSO has no evolution operators, such as crossover and mutation. In PSO, the potential solutions, called particles, fly through the problem space by following the current optimum particles. Compared to GA, the advantages of PSO are that PSO is easy to implement and there are few parameters to adjust.

Moreover, PSO, like all evolutionary algorithms, optimizes a performance index based on input/output relationships only. Therefore, minimal knowledge of the plant under investigation is required. In addition, because derivative information is not needed in the execution of the algorithm, many pitfalls that gradient search methods suffer from can be overcome. It would be desirable to perform trajectory optimization of a Micro Air Launch Vehicle (MALV) using a particle swarm optimization method.

Thus, a particle swarm-based micro air launch vehicle trajectory optimization method solving the aforementioned problems is desired.

SUMMARY OF THE INVENTION

The particle swarm-based micro air launch vehicle trajectory optimization method is carried out using a parameter optimization problem, and it is formulated as a single objective optimization problem with the explicit objective to maximize the payload mass. Constraints on terminal conditions are imposed.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
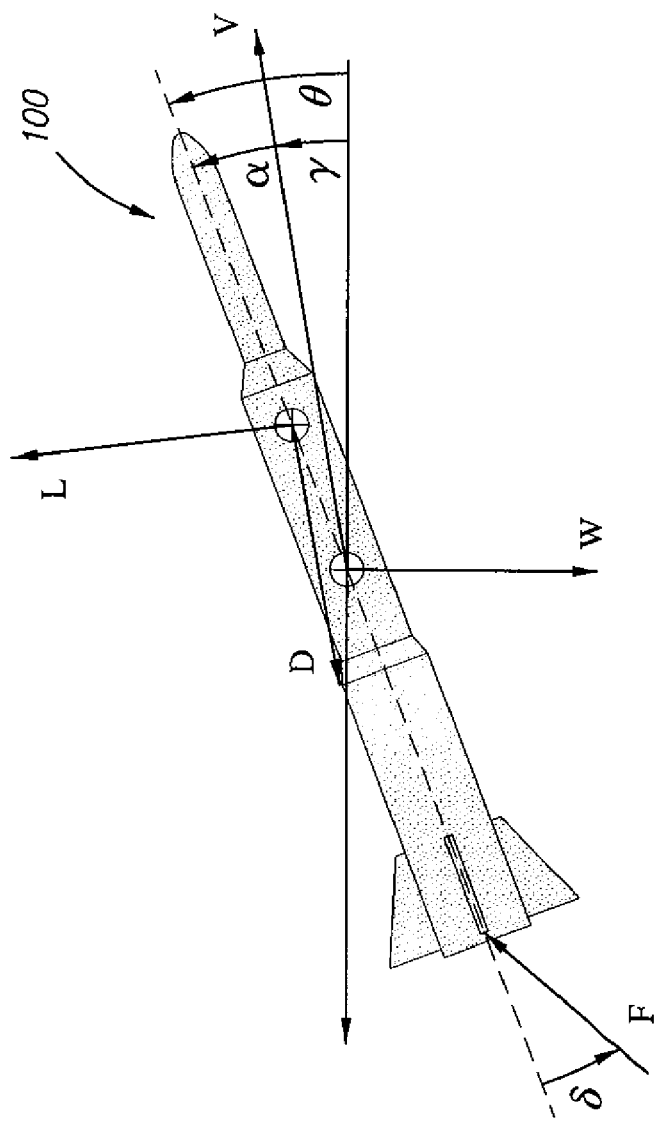
FIG. 1 is diagram showing mathematical modeling of micro air launch vehicle trajectory parameters.
Figure 2A:
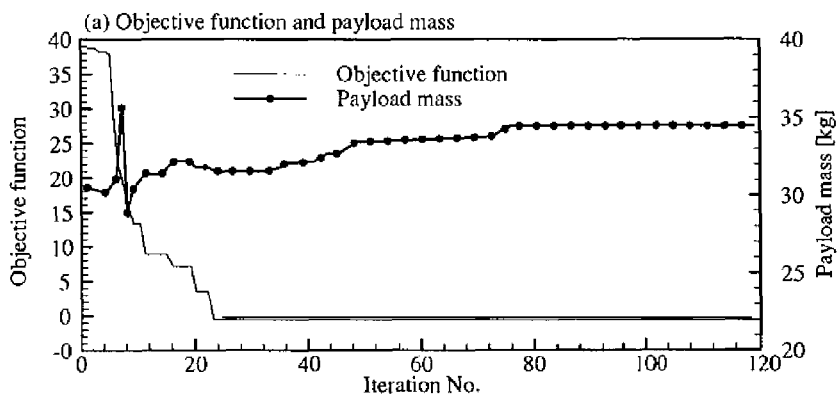
FIG. 2A is a plot showing the history of the objective function (payload mass) vs. particle swarm iterations for a representative simulation.
Figure 2B:
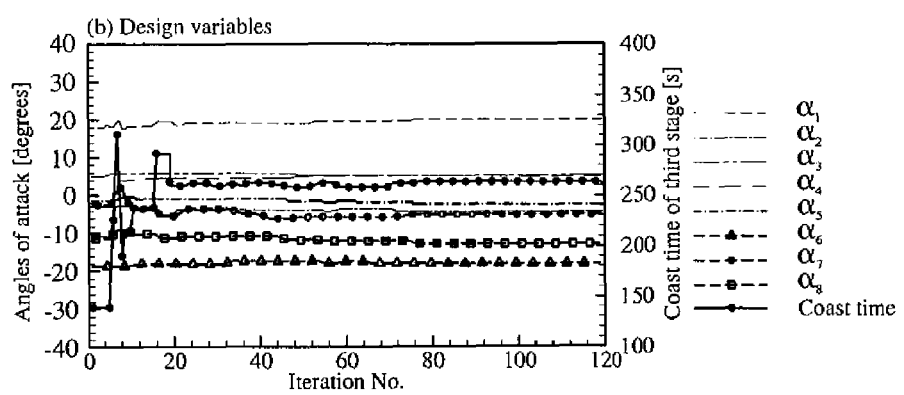
FIG. 2B is a plot showing the history of design variables vs. particle swarm iterations for a representative simulation.

The particle swarm-based micro air launch vehicle trajectory optimization method capitalizes on the fact that for an early phase of preliminary design of a launch vehicle, a relatively fast trajectory optimization tool is required in order to support an early decision-making process. The Micro Air Launch Vehicle (MALV) 100 is modeled as a point mass with two degrees of freedom as illustrated in FIG. 1.

The equations of motion are written with respect to a non-rotating, spherical Earth as follows:

$$\frac{dV}{dt} = \frac{1}{M} - [F\cos(\alpha + \delta) - D] - g\sin\gamma \quad (1)$$

$$V\frac{d\gamma}{dt} = \frac{1}{M}[F\sin(\alpha + \delta) + L] - g\cos\gamma + \frac{v^2}{r}\cos\gamma \quad (2)$$

In the above equations of motion, V is the velocity of the vehicle center of mass, M is the vehicle mass, F is total thrust, g is the local acceleration of gravity, α is the angle of attack, δ is the thrust vector deflection, γ is the flight path angle, r is the distance from the center of the Earth to the vehicle mass center, D is the drag, and L is the lift. The acceleration of gravity at altitude h is calculated from:

$$g = g_0(R_{Earth})^2/r^2 \quad (3)$$

where $r = R_{Earth} + h$.

The engine thrust at any altitude is calculated from the engine vacuum thrust through:

$$F = F_{vac} - p_\alpha A_{exit} \quad (4)$$

The MALV position (altitude and range) can be calculated from:

$$\frac{dx}{dt} = V\cos\gamma \quad (5)$$

$$\frac{dh}{dt} = V\sin\gamma$$

The lift and drag forces can be expressed as:

$$L = qS_{ref}C_L, C_L = C_L(\alpha, M) \quad (6)$$

$$D = qS_{ref}C_D, CD = C_D(\alpha, M) \quad (7)$$

$$q = \frac{1}{2}\rho V^2, M = V/a \quad (8)$$

The aerodynamic coefficients for lift $C_L$ and drag $C_D$ are calculated as functions of angle attack and Mach number using the Missile DATCOM. Missile DATCOM is software that uses empirical aerodynamic formulae to predict the aerodynamic coefficients and derivatives of a wing-body-fin configuration at a given range of angles of attack and Mach numbers. The vehicle engine thrust and total mass are provided as functions of time.

We assume the MLAV will be launched from a mother airplane at a shallow or zero angle of attack. During the early launch time, thrust and aerodynamic lift will be used to gain altitude. Since the vehicle pitch angle θ is typically controlled using fins during atmospheric flight, we assume controlled angle-of-attack steering, which means α is used as an input. As the vehicle gains altitude and the aerodynamic loads become insignificant, thrust vector control is assumed, which means that δ will also be used as an input. A typical steering scenario, which is very efficient in this phase of flight, is a linear tangent pitch method. However, in our model, α will be used to control the pitch indirectly, since:

$$\theta = \alpha + \gamma \quad (9)$$

Therefore, the angle of attack will be used as the trajectory design parameter. The flight path angle can then be calculated from integration of equation (2), and pitch can be computed from equation (9).

The preliminary MALV model utilized in the optimization method is built based on a downsized Pegasus XL air launch vehicle, which is a successful operational air launch system. It is assumed that a multistage rocket can be scaled down to produce smaller versions capable of attaining orbit with lighter payloads. In this downsizing process, the fraction of mass for each stage to total vehicle mass is maintained, and the mass of each component is determined by using the scale factor and the cubic scaling law. This law infers that (for the same average density) the ratio of scaled-down mass to full-size mass is given by the cube of the scale factor, that is:

$$M_{scaled} = M_{full}\left(\frac{L_{scaled}}{L_{full}}\right)^3 \quad (10)$$

where L is a characteristic length of the air launch vehicle. If the scale factor is one-half, the mass ratio is one-eighth, and a half-size component ideally has only one-eighth the mass of the full-size component. Special attention should be given to the scaling of the solid rocket nozzle for each stage so that the burn times and the thrust-to-weight levels are maintained at the proper values. Unlike assumptions that the avionics and the attitude control hardware will not scale down as the length cubed, there is accumulated technological evidence that the scaling down of microelectronic devices with time is even steeper, which is compensated herein by a cubic scale law, since the exemplary full-scale vehicle has microelectronic technology that is more than 20 years old.

We assume the inlet conditions and expansion ratio of the downsized vehicle nozzles are the same as those of the full-scale vehicle. This will imply the specific impulse will be the same for downsized and full-scale engines, since specific impulse is a function of nozzle inlet conditions and expansion ratio.

$$(I_{sp})_{scaled} = (I_{sp})_{full} \quad (11)$$

Also, each engine mass flow is proportional to the exit area, assuming the same nozzle inlet conditions and expansion ratio, and choked under expanding nozzle performance, or:

$$\dot{m}_{scaled} = \dot{m}_{full}\left(\frac{L_{scaled}}{L_{full}}\right)^2. \quad (12)$$

The burning time is scaled as:

$$t_{burningscaled} = M_{burningfull}\left(\frac{L_{scaled}}{L_{full}}\right). \quad (13)$$

From equations (10) and (11), the thrust of each engine can be scaled down as the square of the characteristic length, or:

$$F_{scaled} = F_{full}\left(\frac{L_{scaled}}{L_{full}}\right)^2. \quad (14)$$

Details of an exemplary micro air launch vehicle system that a computer-implemented version of the trajectory control optimization method could be deployed in to upload optimized parameters to the mission computer of a satellite carrying vehicle are included in U.S. Pat. No. 6,921,051, issued on Jul. 26, 2005, which is hereby incorporated by reference in its entirety.

In the exemplary model, we assume fixed vehicle design for each stage, with variable payload capacity based on mission requirements. The angle of attack at specified instances and the coast time before ignition were chosen as the design variables. The objective function is chosen to be the payload mass. Required orbit parameters, i.e., orbit insertion altitude, velocity, and flight path angle, are treated as constraints as well.

The optimization problem can be formulated as maximizing $M_{payload}$ subject to the following terminal conditions, which are imposed by mission requirements:

$$\left|\frac{h_f - h_{orbit}}{h_{orbit}}\right| < \varepsilon_1 \quad (15)$$

$$\left|\frac{v_f - v_{orbit}}{v_{orbit}}\right| < \varepsilon_2$$

$$|\gamma_f - \gamma_{orbit}| < \varepsilon_3$$

and the following design constraints:

$$\alpha_{min} < \alpha_i < \alpha_{max}, i=1,2,\ldots,IMAX$$

$$t_{coast_{min}} < t_{coast} < t_{coast_{max}}$$

$$M_{payload_{min}} < M_{payload} < M_{payload_{max}} \quad (16)$$

where $t_{coast}$ is the coasting time of the third stage.

The above optimal control problem is converted into a parameter optimization problem by specifying values for the angle of attack at the nodes as optimization variables. The angle of attack values between the nodes are obtained by linear interpolation from the neighboring nodes.

PSO simulates the behaviors of bird flocking. Suppose the following scenario: a group of birds are randomly searching food in an area. There is only one piece of food in the area being searched. All the birds do not know where the food is. But they know how far the food is in each iteration. So what's the best strategy to find the food? The effective one is to follow the bird that is nearest to the food.

PSO learns from the scenario and uses it to solve the optimization problems. In PSO, each single solution is a bird, i.e., a particle in the search space. All of the particles have fitness values, which are evaluated by the fitness function to be optimized, and have velocities, which direct the flying of the particles. The particles fly through the problem space by following the current optimum particles.

PSO is initialized with a group of random particles (solutions) and then searches for optima by updating generations. In every iteration, each particle is updated by following two best values. The best values represent the lowest values for the objective function, since our problem is a minimization problem. For each particle, $P_{best}$ is the best solution (fitness) achieved so far during the iteration. Another best value that is tracked by the particle swarm optimizer is the best value obtained so far by any particle in the population, which is, by definition, a global best, i.e., $G_{best}$. After finding these two best values, the particle updates its velocity and position with the following two equations as:

$$v_i(k+1)=\phi v_i(k+1)+c_1 \text{rand}(\;)(P_{best}-x_{pi}(k))+c_1 \text{rand}(\;)(G_{best}-x_{pi}(k)) \quad (17)$$

$$x_{pi}(k+1)=x_{pi}(k)+v_i(k+1) \quad (18)$$

where v is the particle velocity and $x_p$ is the current particle position (solution). The pseudo code of the procedure is as follows:

```
//Randomly initialize N particles
Do
  For each particle
    Calculate fitness value (i.e. objective function)
    If the fitness value is better than the best fitness
    value (P_best) in history, set current value as the new
    P_best
  end
End
Choose the particle with the best fitness value of all
the particles as the G_best
For each particle
  Calculate particle velocity according equation (17)
  Update particle position according equation (18)
End
While maximum iterations or minimum error criteria is not attained.//
```

It is assumed that the MALV has one-half the size of a Pegasus air launch vehicle in each dimension. The target orbit is a polar circular Low-Earth-Orbit (LEO) of 400 km in altitude. The MALV is assumed to be launched from a mother airplane at 0.8 Mach and 11,900 km in altitude. For optimization, ten design variables are used, including eight angles of attacks distributed such that four of them are in the first stage and two each for the second and third stages, with range $-20° < \alpha_i < 30°$, i=1, 2, ..., 8. The ninth design variable is the coasting time with range 50 s $< t_{coast} < 400$ s, and the tenth design variable is the payload with range 1 kg $< M_{payload} < 100$ kg. The augmented objective function is:

$$Obj = \quad (19)$$
$$-\frac{M_{payload}}{M_{payload_{max}}} + Pen \times \left(\left|\frac{h_f - h_{orbit}}{h_{orbit}}\right| + \left|\frac{v_f - v_{orbit}}{v_{orbit}}\right| + |\gamma_f - \gamma_{orbit}|\right)$$

where Pen is the penalty parameter defined by:

$$Pen = \begin{cases} 100 & \text{if constraints error} > 0.001 \\ 0 & \text{if constraints error} < 0.001. \end{cases} \quad (20)$$

From previous experience, thirty particles are considered as an optimum number of particles. Therefore, thirty particles were used in this exemplary embodiment. The canonical particle swarm method is used with particle velocity parameters $\phi=0.7298$, $\gamma_1=\gamma_2=1.49618$.

Figure 3A:
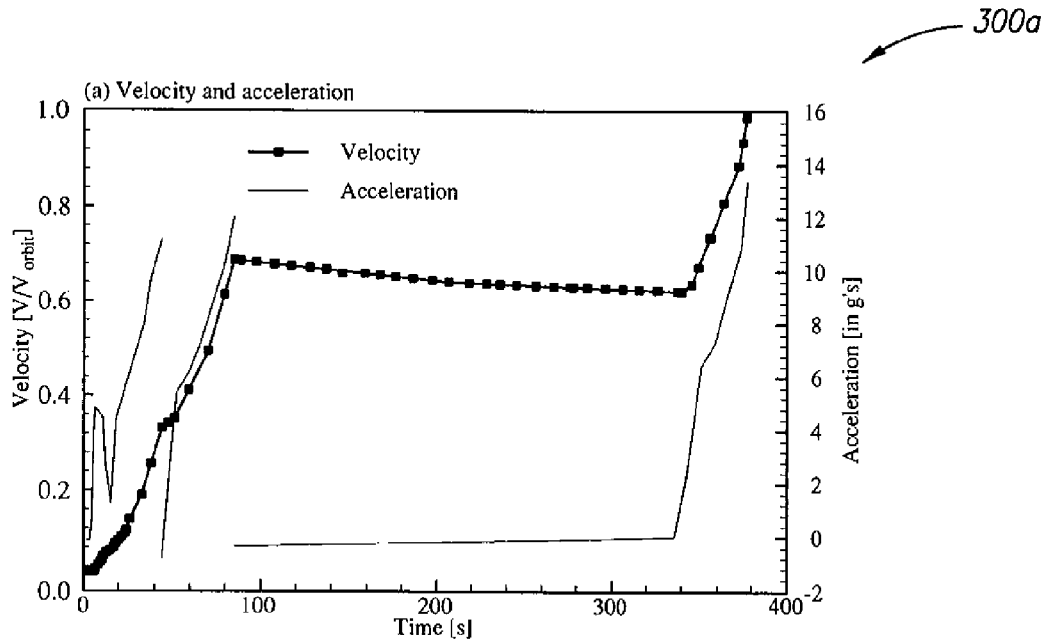
FIG. 3A is a plot showing velocity and acceleration as a function of time for a representative simulation.
Figure 3B:
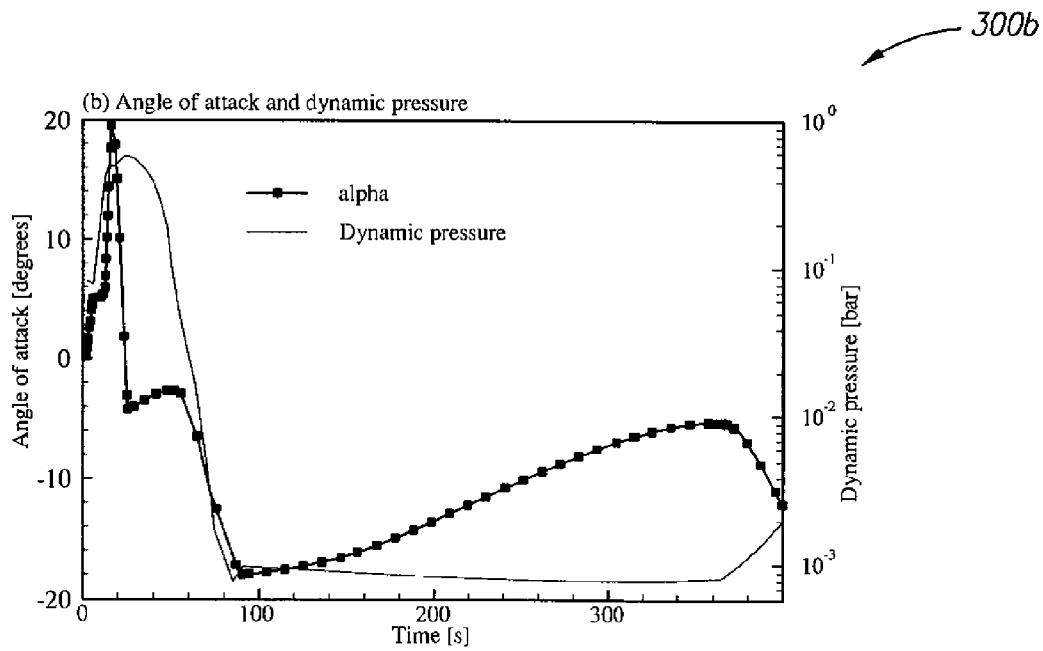
FIG. 3B is a plot showing angle of attack and dynamic pressure as a function of time for a representative simulation.

FIG. 3A gives the time history of velocity and acceleration while FIG. 3B gives the time history of the angle of attack and dynamic pressure. It is very important to maintain a low angle of attack in regions of high dynamic pressure to avoid excessive drag losses, in addition to reducing aerodynamic heating and bending moments. Although not explicitly imposed, it is interesting to note that the angle of attack is less than 4° in the vicinity of the maximum dynamic pressure, which drops by almost two orders of magnitude below the maximum value as the absolute of the angle of attack increases to 18°.

Figure 4:
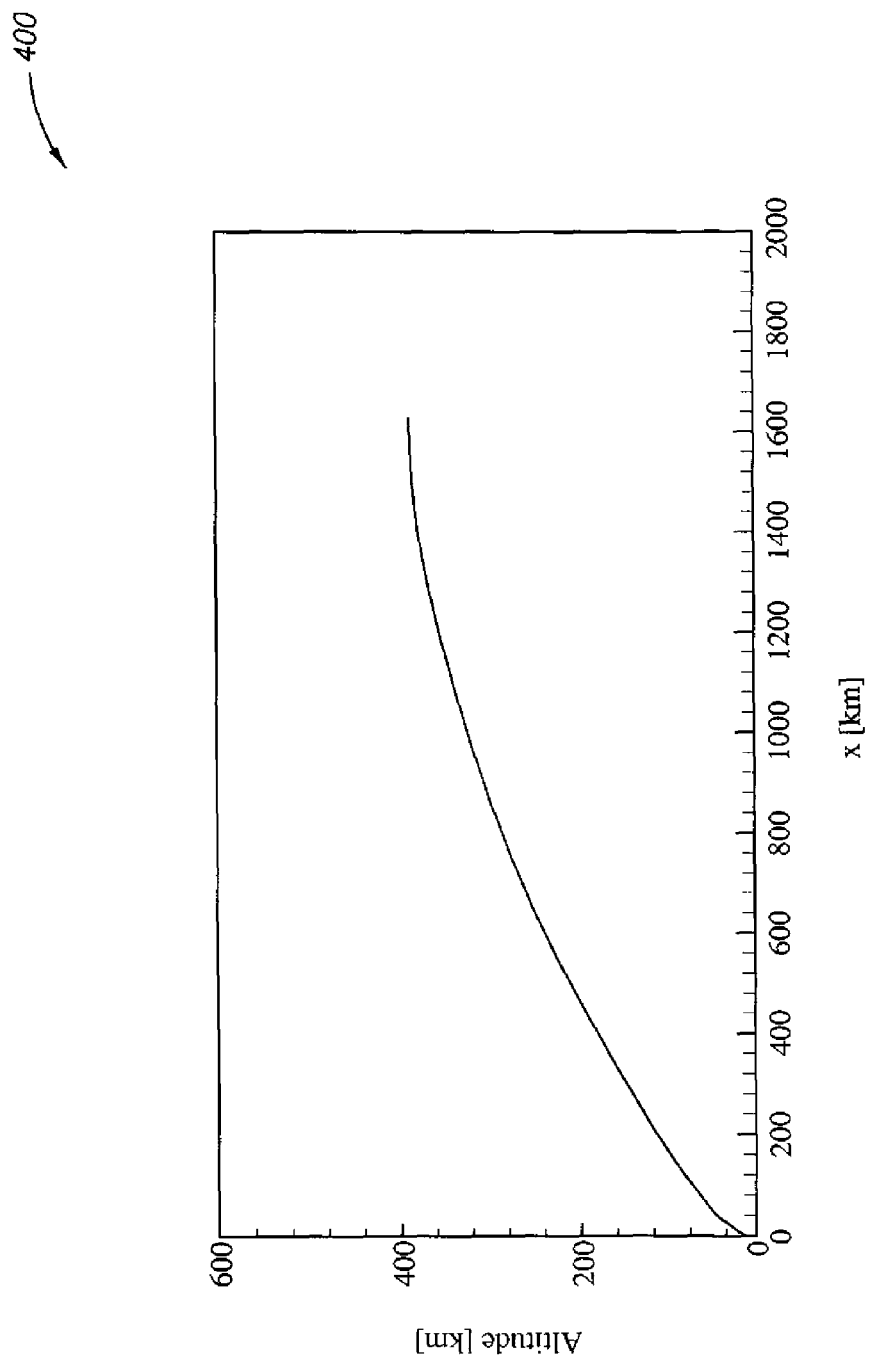
FIG. 4: is a plot showing optimal trajectory for the representative simulation of FIGS. 2A through 3B.

FIG. 4 shows the optimal trajectory of the MALV, which illustrates the achievement of the target orbit height after a range of about 1,600 km.

In the exemplary embodiment, the particle swarm optimization method was used to optimize the trajectory of a micro air launch vehicle, which is sized to be one-half the length and diameter of the successful air launch vehicle Pegasus. Scaling laws based on physical principles and technological trends were adopted to scale down the vehicle propulsion parameters. The optimization problem was formulated to maximize the vehicle payload mass as a fitness function. Eight angles of attack, the coasting time of the third stage, as well as the payload mass were selected as the design variables, and the target orbit parameters were selected as the design constraints.

The payload mass was successfully maximized after 120 PSO iterations using 30 particles per swarm. The maximum payload for a target polar circular orbit of 400 km altitude is about 34.4 kg.

It will be understood that the diagrams in the drawings depicting the particle swarm based micro air launch vehicle trajectory optimization method are exemplary only, and may be embodied in a dedicated electronic device having a microprocessor, microcontroller, digital signal processor, application specific integrated circuit, field programmable gate array, any combination of the aforementioned devices, or other device that combines the functionality of the particle swarm based micro-air launch vehicle trajectory optimization method onto a single chip or multiple chips programmed to carry out the method steps described herein, or may be embodied in a general purpose computer having the appropriate peripherals attached thereto and software stored on a computer readable media that can be loaded into main memory and executed by a processing unit to carry out the functionality of the apparatus and steps of the method described herein.

It is to be understood that the present invention is not limited to the embodiment described above, but encompasses any and all embodiments within the scope of the following claims.

We claim:

1. A computer-implemented particle swarm-based micro air launch vehicle trajectory optimization method, comprising the steps of:
generating a micro air launch vehicle attitude control trajectory profile, the profile including launch vehicle trajectory parameters for orbital insertion of a payload carried by the launch vehicle, the launch vehicle including a plurality of stages;
optimizing the launch vehicle trajectory parameters via a particle swarm optimization procedure, the particle swarm optimization procedure maximizing payload mass; and
uploading the launch vehicle trajectory parameters to the micro air launch vehicle;
whereby the micro air launch vehicle delivers the maximized payload mass into orbit via the trajectory profile.

2. The computer-implemented particle swarm-based micro air launch vehicle trajectory optimization method according to claim 1, further comprising the steps of
formulating a fitness function maximizing the vehicle payload mass, the fitness function being used by the particles of the particle swarm optimization procedure to find a global maximum of the vehicle payload mass as defined by the fitness function;
determining trajectory design parameters of the trajectory profile, the trajectory design parameters including at least one angle of attack of the launch vehicle during each of the vehicle stages, and a coast time before ignition of each of the vehicle stages;
determining constraints on the fitness function, the constraints including orbit insertion altitude, velocity and flight path angle; and
iteratively calculating the fitness function using the particles;
wherein the particle swarm ultimately returns the global maximum of the fitness function.

3. The computer-implemented particle swarm-based micro air launch vehicle trajectory optimization method according to claim 2, further comprising: the step of using about thirty particles, a maximum particle velocity of about 0.7298, and a learning factor of about 1.49618 in the particle swarm optimization algorithm.

4. The computer-implemented particle swarm-based micro air launch vehicle trajectory optimization method according to claim 2, further comprising: the step of scaling the design parameters and the constraints as a factor of a size of the launch vehicle.

5. The computer-implemented particle swarm-based micro air launch vehicle trajectory optimization method according to claim 2, wherein the fitness function formulating step further comprises evaluating an objective function characterized by the relation:

$$Obj = -\frac{M_{payload}}{M_{payload_{max}}} + Pen \times \left( \left| \frac{h_f - h_{orbit}}{h_{orbit}} \right| + \left| \frac{v_f - v_{orbit}}{v_{orbit}} \right| + |\gamma_f - \gamma_{orbit}| \right)$$

where $M_{payload}$ is an optimized payload mass, $M_{payload_{max}}$ is a maximum theoretical payload mass, Pen is a constraints error penalty parameter, $h_f$ is an initial altitude, $h_{orbit}$ is an orbital insertion altitude, $v_f$ is an initial velocity, $v_{orbit}$ is an orbital insertion velocity, $y_f$ is an initial flight path angle, and $y_{orbit}$ is an orbital insertion flight path angle.

* * * * *